United States Patent
Ohata et al.

(10) Patent No.: US 10,863,041 B2
(45) Date of Patent: Dec. 8, 2020

(54) IMAGE FORMING APPARATUS HAVING TERMINAL HOLDING PORTION

(71) Applicant: KYOCERA Document Solutions Inc., Osaka (JP)

(72) Inventors: Shinobu Ohata, Osaka (JP); Koshiro Tomimori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/620,097

(22) PCT Filed: Mar. 20, 2018

(86) PCT No.: PCT/JP2018/010985
§ 371 (c)(1),
(2) Date: Dec. 6, 2019

(87) PCT Pub. No.: WO2018/225332
PCT Pub. Date: Dec. 13, 2018

(65) Prior Publication Data
US 2020/0204690 A1    Jun. 25, 2020

(30) Foreign Application Priority Data
Jun. 8, 2017  (JP) .................... 2017-113182

(51) Int. Cl.
*H04N 1/00*  (2006.01)
(52) U.S. Cl.
CPC ..... *H04N 1/00307* (2013.01); *H04N 1/00408* (2013.01); *H04N 1/00557* (2013.01); *H04N 1/00559* (2013.01)
(58) Field of Classification Search
CPC ........... H04N 1/00307; H04N 1/00408; H04N 1/00557; H04N 1/00559; H04N 1/00; H04N 2201/0096; H04N 2201/001; H04N 1/00501; H04N 1/00204; H04N 1/00496; H04N 2201/0058; H04N 1/00411; G03G 21/16; G06F 3/1423; G06F 3/14; G06F 3/1446; G09G 2340/14
See application file for complete search history.

(56) References Cited

U.S. PATENT DOCUMENTS

| | | | |
|---|---|---|---|
| 2008/0158602 A1* | 7/2008 | Nakai | H04N 1/00411 358/1.16 |
| 2010/0238091 A1* | 9/2010 | Katsuyama | G06F 3/1423 345/1.3 |
| 2016/0134763 A1 | 5/2016 | Haapanen | |

FOREIGN PATENT DOCUMENTS

| | | |
|---|---|---|
| JP | 2010218471 A | 9/2010 |
| JP | 2014011530 A | 1/2014 |
| JP | 201696546 A | 5/2016 |

* cited by examiner

*Primary Examiner* — Iriana Cruz
(74) *Attorney, Agent, or Firm* — Alleman Hall Creasman & Tuttle LLP

(57) ABSTRACT

An image forming apparatus including: an image forming portion configured to form an image on a sheet; an image reading portion provided above the image forming portion and configured to read an image from a document sheet; a housing storing the image forming portion and the image reading portion; an operation/display portion provided more outside the housing than a front surface of the housing, and used to operate the image forming apparatus; and a slit provided at the operation/display portion and configured to hold a mobile terminal that is smaller in size than the operation/display portion.

2 Claims, 6 Drawing Sheets

IMAGE FORMING APPARATUS HAVING TERMINAL HOLDING PORTION

TECHNICAL FIELD

The present invention relates to an image forming apparatus including an image reading portion for reading an image from a document sheet, and an image forming portion for forming an image on a sheet.

BACKGROUND ART

There is known an image forming apparatus, such as a copier, that includes an image reading portion for reading an image from a document sheet, and an image forming portion for forming an image on a sheet, the image forming apparatus being communicably connected with an external information processing apparatus (see, for example, PTL 1).

In addition, there is known an image forming apparatus that can be operated by using a mobile terminal, such as a smartphone, that is communicably connected with the image forming apparatus. In this type of image forming apparatus, for example, it is possible to operate the mobile terminal that a user is carrying, to set a transmission destination of image data that was obtained by the image reading portion by scanning a document sheet.

CITATION LIST

Patent Literature

[PTL 1] Japanese Patent Application Publication No. 2016-96546

SUMMARY OF THE INVENTION

Problems to be Solved by the Invention

Meanwhile, when the user operates the image forming apparatus by using the mobile terminal, the user operates the mobile terminal by holding the mobile terminal in one hand. However, in the image forming apparatus, the user may need to do a work that requires holding a sheet in his/her hands, such as placing a document sheet to be scanned on the document sheet table. In that case, the user would be able to do the work while holding the mobile terminal in one hand. However, doing the work with one hand is inconvenient. On the other hand, the inconvenience will be solved if, only for a period of time in which the work is done, the user can place the mobile terminal on an appropriate space such as a nearby desk. However, it is troublesome to search for such a space around the image forming apparatus. It is well if such a space can be found on an upper surface of the image forming apparatus. However, a streamline design is often adopted as the design of the image forming apparatus from the viewpoint of an outer appearance design. In addition, in these years, the size of the mobile terminal has increased as the display screen has expanded. As a result, even if a space for placing the mobile terminal is found on the upper surface of the image forming apparatus, it is not practically possible to place the mobile terminal thereon since the mobile terminal might drop from the upper surface. Furthermore, even when the user is doing the work without holding the mobile terminal, the user would want to confirm contents of display screens of both the mobile terminal and the operation/display portion to prepare for the next operation. However, according to a conventional image forming apparatus, the user cannot confirm contents of the display screens of the mobile terminal and the operation/display portion if he/she is doing the work without holding the mobile terminal. This is inconvenient to the user.

The present invention has been made in view of such conventional circumstances, and it is an object of the present invention to provide an image forming apparatus which can be operated by using a mobile terminal, and in which contents of display screens of the mobile terminal and an operation/display portion can be easily confirmed even in a state where the mobile terminal is not held by hand.

Solution to the Problems

An image forming apparatus according to an aspect of the present invention includes an image forming portion, an image reading portion, a housing, an operation/display portion, and a terminal holding portion. The image forming portion forms an image on a sheet. The image reading portion is provided above the image forming portion and reads an image from a document sheet. The housing stores the image forming portion and the image reading portion. The operation/display portion is provided more outside the housing than a specific outer surface of the housing among outer surfaces of the housing, the operation/display portion being used to operate the image forming apparatus. The terminal holding portion is provided at the operation/display portion and is configured to hold a mobile terminal that is smaller in size than the operation/display portion.

Advantageous Effects of the Invention

According to the present invention, in an image forming apparatus which can be operated by using a mobile terminal, contents of display screens of the mobile terminal and an operation/display portion can be easily confirmed even in a state where the mobile terminal is not held by hand.

DESCRIPTION OF EMBODIMENTS

The following describes embodiments of the present invention with reference to the accompanying drawings for the understanding of the invention. It should be noted that the following embodiments are examples of specific embodiments of the present invention and should not limit the technical scope of the present invention.

First Embodiment

Figure 1:
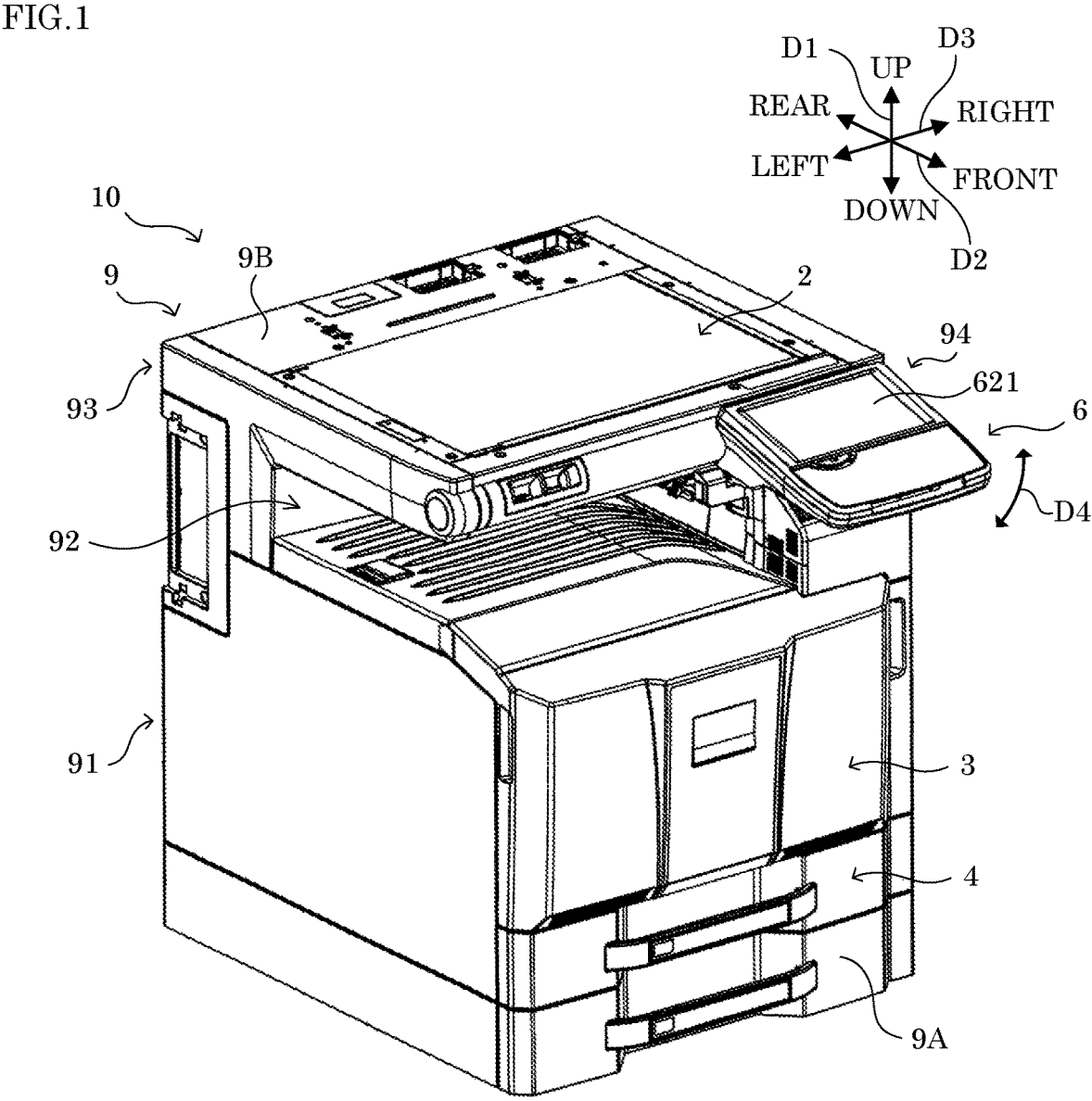
FIG. 1 is a diagram showing an outer appearance configuration of an image forming apparatus according to a first embodiment of the present invention.
Figure 2:
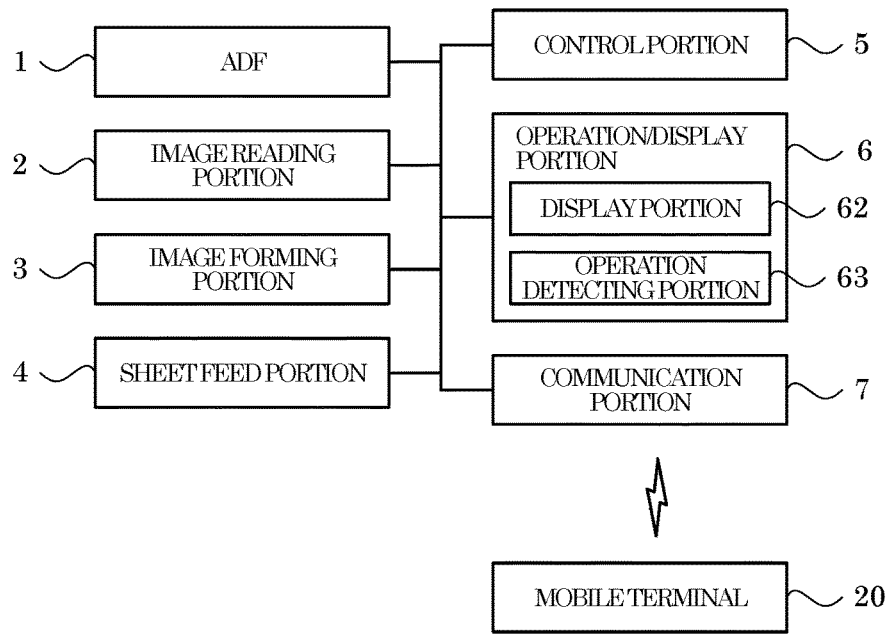
FIG. 2 is a block diagram showing a system configuration of the image forming apparatus according to the first embodiment of the present invention.
Figure 3:
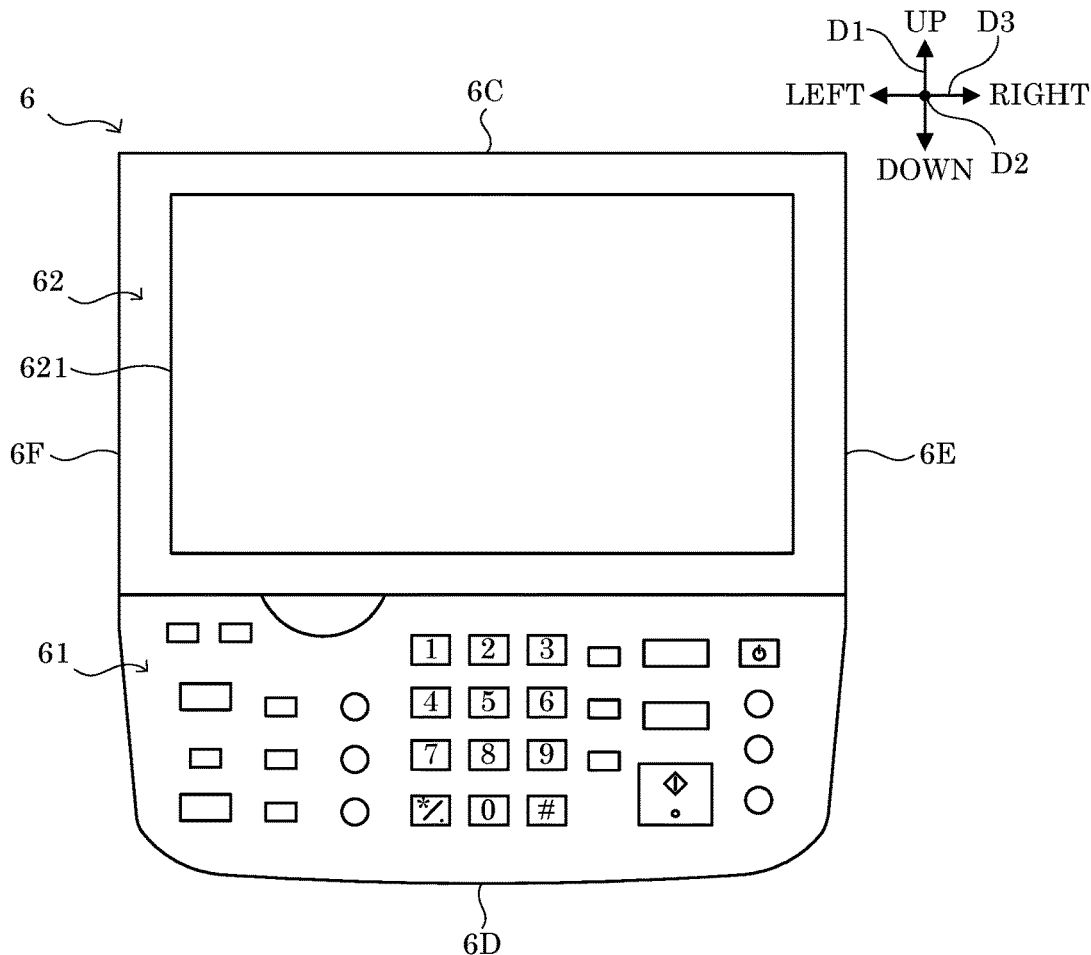
FIG. 3 is a diagram showing a configuration of an operation/display portion of the image forming apparatus according to the first embodiment of the present invention.

First, a description is given of an outline configuration of an image forming apparatus 10 according to a first embodiment of the present invention with reference to FIG. 1 to FIG. 3. Here, FIG. 1 is a perspective diagram showing an outer appearance configuration of the image forming apparatus 10. In addition, FIG. 3 is a front diagram showing a configuration of an operation/display portion 6. It is noted that FIG. 1 shows the image forming apparatus 10 in a state where an ADF 1 has been removed therefrom.

It is noted that, for the sake of explanation, a vertical direction in a state where the image forming apparatus 10 is usably installed (the state shown in FIG. 1), is defined as an up-down direction D1. In addition, a front-rear direction D2 is defined on the supposition that a side of the image forming apparatus 10 on the right front side of the plane of FIG. 1 is a front side (front). Furthermore, a left-right direction D3 is defined based on the image forming apparatus 10 in the installation state viewed from the front side.

The image forming apparatus 10 is a multifunction peripheral having a plurality of functions such as a scan function for reading image data from a document sheet, a print function for forming an image based on image data, a facsimile function, and a copy function. It is noted that the present invention is applicable to an image forming apparatus such as a facsimile apparatus and a copier.

As shown in FIG. 1 and FIG. 2, the image forming apparatus 10 includes the ADF 1, an image reading portion 2, an image forming portion 3, a sheet feed portion 4, a control portion 5, the operation/display portion 6, a communication portion 7, and a housing 9.

The housing 9 is formed in the shape of a parallelepiped box. The image reading portion 2, the image forming portion 3, the sheet feed portion 4, the control portion 5, and the communication portion 7 are provided in the inside of the housing 9. As shown in FIG. 1, the housing 9 includes a first storage portion 91, a sheet discharge portion 92, a second storage portion 93, and a stepped portion 94.

The first storage portion 91 forms a lower portion of the housing 9. The first storage portion 91 stores the image forming portion 3, the sheet feed portion 4, the control portion 5, and the communication portion 7. The front surface of the first storage portion 91 forms a front surface 9A (see FIG. 1) of the housing 9. The sheet discharge portion 92 is formed on an upper portion of the first storage portion 91. A sheet on which an image has been formed by the image forming portion 3 is discharged to the sheet discharge portion 92. The second storage portion 93 is provided above the sheet discharge portion 92, and forms an upper portion of the housing 9. The second storage portion 93 stores the image reading portion 2. An upper surface of the second storage portion 93 forms an upper surface 9B (see FIG. 1) of the housing 9. The ADF 1 is provided on the upper surface 9B. As shown in FIG. 1, the first storage portion 91 projects more frontward than the second storage portion 93. The stepped portion 94 is composed of an upper surface of the first storage portion 91 and a front surface of the second storage portion 93 (see FIG. 4). The operation/display portion 6 is provided on the stepped portion 94.

The ADF 1 is an automatic document sheet feeding device that includes a document sheet setting portion, a plurality of conveyance rollers, a document sheet pressing, and a sheet discharge portion, and conveys a document sheet so that it is read by the image reading portion 2. The ADF 1 is provided so as to be openable/closable with respect to the upper surface 9B of the housing 9. The image reading portion 2 includes a document sheet table, a light source, a plurality of mirrors, an optical lens, and a CCD, and is configured to read image data from a document sheet.

The image forming portion 3 is configured to form a color or monochrome image on a sheet by an electrophotographic method based on image data read by the image reading portion 2. In addition, the image forming portion 3 is also configured to form an image on a sheet based on image data input from an external information processing apparatus such as a personal computer. Specifically, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, and a sheet discharge tray. In the image forming portion 3, a color or monochrome image is formed on a sheet supplied from the sheet feed portion 4, and the sheet with the image formed thereon is discharged to the sheet discharge portion 92. It is noted that the sheet is a sheet-like material such as a sheet of paper, a sheet of coated paper, a postcard, an envelope, and an OHP sheet.

The control portion 5 includes control equipment such as a CPU, a ROM, and a RAM. The CPU is a processor that executes various calculation processes. The ROM is a non-volatile storage device in which various information such as control programs for causing the CPU to execute various processes are preliminarily stored. The RAM is a volatile storage device that is used as a temporary storage memory (working area) for the various processes executed by the CPU. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 is a user interface used to operate the image processing apparatus 10. As shown in FIG. 2 and FIG. 3, the operation/display portion 6 includes hard keys 61, a display portion 62, and an operation detecting portion 63.

The hard keys 61, in response to user operations, input various types of information to the control portion 5. For example, the hard keys 61 include: a power source key used to turn on or off the power of the image forming apparatus 10; a start key used to input an instruction to execute a print process or the like to the control portion 5; and numeric keys used to input numeric information or the like to the control portion 5.

The display portion 62 displays screens such as an operation screen that is used to operate the image forming apparatus 10. For example, the display portion 62 is a liquid crystal display. As shown in FIG. 3, the display portion 62 includes a display surface 621 (an example of a first display surface of the present invention) on which the operation screen is displayed.

The operation detecting portion 63 is what is called a touch panel configured to detect an operation made by the user on the display surface 621 of the display portion 62. For example, when an operation object, such as a finger of the user, comes in contact with the display surface 621, the operation detecting portion 63 detects, by an electrostatic capacitance method, a contact position on the display surface 621 at which a contact by the operation object is made. It is noted that the operation detecting portion 63 may use any other detection method, such as a resistance film method, to detect a contact of the operation object and the display surface 621.

The communication portion 7 is a communication interface that is configured to execute a wireless data communication with an external information terminal apparatus. For example, the communication portion 7 executes a wireless data communication with the external information terminal apparatus in accordance with communication protocols defined by Bluetooth (registered trademark). For example, the communication portion 7 executes a wireless data communication by Bluetooth by a radio wave intensity (2.5 mW) of Class 2, with the external information terminal apparatus that is located within a range of approximately 10 meters from the image forming apparatus 10. It is noted that the communication portion 7 may execute a wireless communication with the external information terminal apparatus in accordance with a communication standard of a wireless LAN.

Here, the external information terminal apparatus includes a mobile terminal 20 (see FIG. 2). The mobile terminal 20 is an information terminal apparatus that can perform a wireless communication with the image forming apparatus 10. For example, the mobile terminal 20 is a smartphone equipped with a touch panel. In addition, the mobile terminal 20 may be a tablet terminal having a communication function for communicating with the communication portion 7.

Specifically, the mobile terminal 20 is formed in the shape of a rectangular flat plate, and smaller in size than the operation/display portion 6. The mobile terminal 20 includes a rectangular display surface 21 (see FIG. 5) that extends long in the longitudinal direction of the mobile terminal 20. The display surface 21 occupies most of a surface of the mobile terminal 20.

An application program for functioning the mobile terminal 20 as the operation/display portion 6 of the image forming apparatus 10 has preliminarily been installed in the mobile terminal 20. The user of the image forming apparatus 10 can operate the image forming apparatus 10 by using the mobile terminal 20 by causing the mobile terminal 20 carried by the user to execute the application program. For example, the user of the image forming apparatus 10 can operate the mobile terminal 20 to set a transmission destination of image data that was obtained by the image reading portion 2 by scanning a document sheet.

Meanwhile, when the user of the image forming apparatus 10 operates the image forming apparatus 10 by using the mobile terminal 20, the user operates the mobile terminal 20 by holding the mobile terminal 20 in one hand. However, in the image forming apparatus 10, the user may need to do a work that requires holding a sheet in his/her hands, such as placing a document sheet to be scanned on the document sheet table. In that case, the user would be able to do the work while holding the mobile terminal 20 in one hand. However, doing the work with one hand is inconvenient. On the other hand, the inconvenience will be solved if, only for a period of time in which the work is done, the user can place the mobile terminal 20 on an appropriate space such as a nearby desk. However, it is troublesome to search for such a space around the image forming apparatus 10. It is well if such a space can be found on an upper surface of the image forming apparatus 10. However, a streamline design is often adopted as the design of the image forming apparatus 10, from the viewpoint of an outer appearance design. In addition, in these years, the size of the mobile terminal 20 has increased as the display screen has expanded. As a result, even if a space for placing the mobile terminal 20 is found on the upper surface of the image forming apparatus 10, it is not practically possible to place the mobile terminal 20 thereon since the mobile terminal 20 might drop from the upper surface. Furthermore, even when the user is doing the work without holding the mobile terminal 20, the user would want to confirm contents of display screens of both the mobile terminal 20 and the operation/display portion 6 to prepare for the next operation. However, according to a conventional image forming apparatus, the user cannot confirm contents of the display screens of the mobile terminal 20 and the operation/display portion 6 if he/she is doing the work without holding the mobile terminal 20. This is inconvenient to the user.

On the other hand, in the image forming apparatus 10 according to the first embodiment of the present invention, as described in the following, contents of the display screens of the mobile terminal 20 and the operation/display portion 6 can be easily confirmed even in a state where the mobile terminal 20 is not held by hand.

Figure 4:
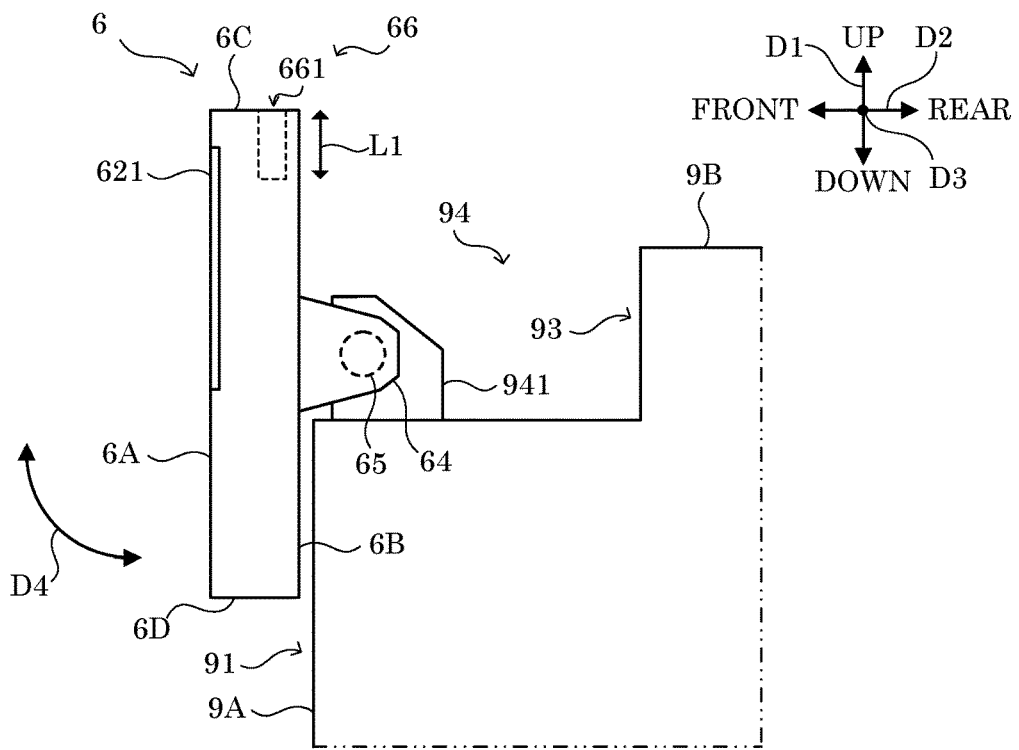
FIG. 4 is a diagram showing a configuration of a terminal holding portion of the image forming apparatus according to the first embodiment of the present invention.
Figure 5:
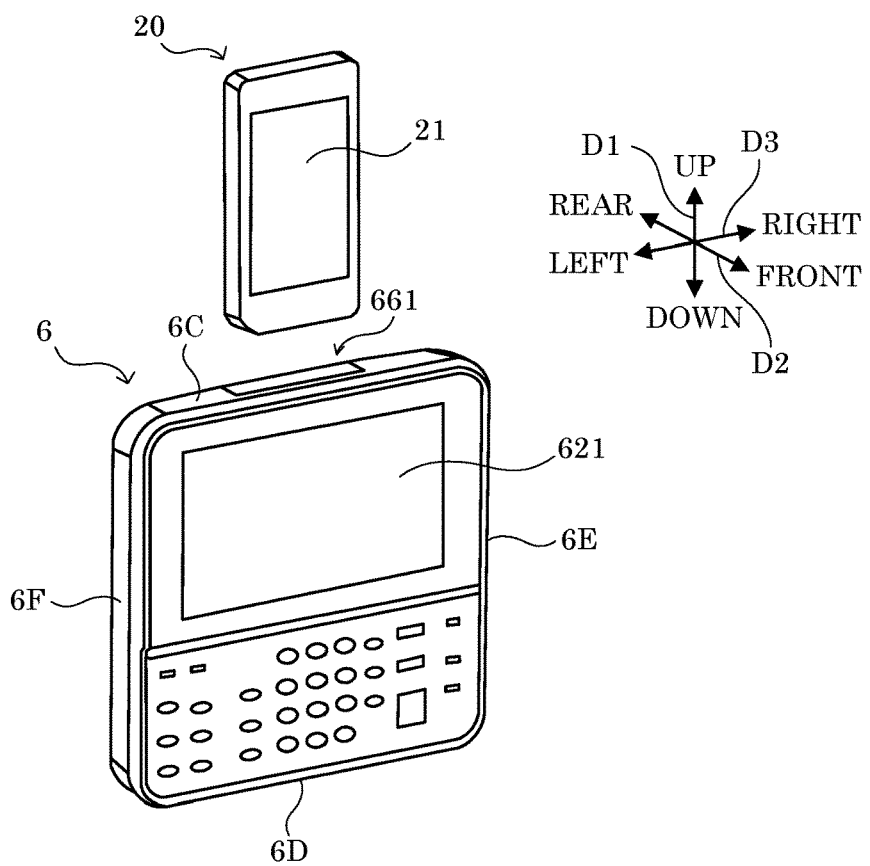
FIG. 5 is a diagram showing a state before the mobile terminal is held by the terminal holding portion of the image forming apparatus according to the first embodiment of the present invention.
Figure 6:
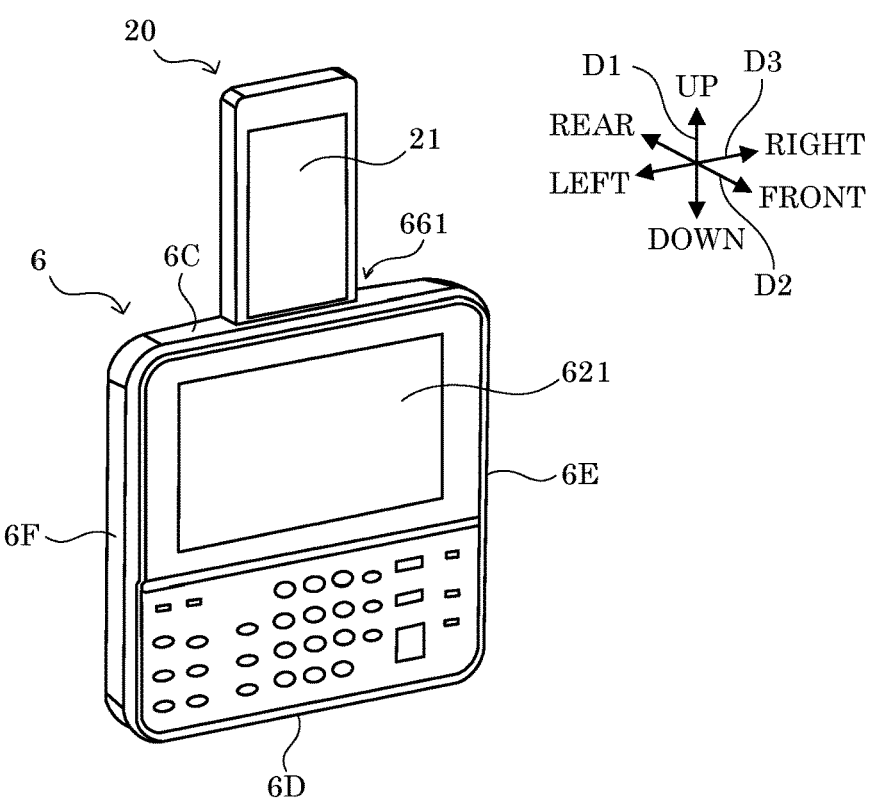
FIG. 6 is a diagram showing a state after the mobile terminal is held by the terminal holding portion of the image forming apparatus according to the first embodiment of the present invention.

In the following, the operation/display portion 6 is described in detail with reference to FIG. 1, and FIG. 4 to FIG. 6. FIG. 4 is a side diagram showing a configuration of a slot 661. FIG. 5 is a perspective diagram showing a state before the mobile terminal 20 is inserted in the slot 661. FIG. 6 is a perspective diagram showing a state after the mobile terminal 20 is inserted in the slot 661.

As shown in FIG. 1, FIG. 3, and FIG. 4, the operation/display portion 6 is formed in the shape of a parallelepiped box that is flat along a plane that is parallel to the display surface 621. As shown in FIG. 3 and FIG. 4, the operation/display portion 6 includes a front surface 6A, a rear surface 6B, an upper surface 6C, a lower surface 6D, a right surface 6E, and a left surface 6F, wherein the front surface 6A includes the display surface 621, the rear surface 6B is opposite to the front surface 6A, and the upper surface 6C, the lower surface 6D, the right surface 6E and the left surface 6F correspond to the four sides of the front surface 6A and the rear surface 6B. It is noted that the shape of the operation/display portion 6 is not limited to the shape of a parallelepiped box that is flat along a plane that is parallel to the display surface 621, but may be any other shape.

The operation/display portion 6 is pivotably provided at the stepped portion 94. Specifically, the operation/display portion 6 is supported in such a way as to pivot around a rotation shaft 65 that is formed at the stepped portion 94 so as to extend in the left-right direction D3. For example, a shaft fixing portion 64 to which the rotation shaft 65 is fixed, is provided on the rear surface 6B of the operation/display portion 6. On the other hand, a bearing portion 941 that supports the rotation shaft 65 in a pivotable manner, is provided on the stepped portion 94. Pivotably supported by the bearing portion 941, the operation/display portion 6 pivots in a pivoting direction D4 as indicated in FIG. 1 and FIG. 4. This allows the operation/display portion 6 to change its attitude between an upright attitude (the state shown in FIG. 4) and an inclined attitude (the state shown in FIG. 1), wherein when the operation/display portion 6 is in the upright attitude, the display surface 621 is perpendicular to a horizontal plane, and when the operation/display portion 6 is in the inclined attitude, the display surface 621 is inclined with respect to the horizontal plane. As shown in FIG. 4, when the operation/display portion 6 is in the upright attitude, the operation/display portion 6 is more outside the housing 9 than the front surface 9A (an example of a specific outer surface of the present invention) of the housing 9. It is noted that the operation/display portion 6 may be fixed, in the upright attitude, to the stepped portion 94. In addition, the operation/display portion 6 may be provided to be more outside the housing 9 than a left or right outer surface of the housing 9.

As shown in FIG. 4, the operation/display portion 6 includes a terminal holding portion 66.

The terminal holding portion 66 is configured to hold the mobile terminal 20. Specifically, as shown in FIG. 4 and FIG. 5, the terminal holding portion 66 of the image forming apparatus 10 according to the first embodiment includes the slot 661.

The slot 661 is formed to extend from one of opposite surfaces of the operation/display portion 6 toward the other, and is formed such that the mobile terminal 20 can be inserted therein. Specifically, the slot 661 extends from the upper surface 6C of the operation/display portion 6 toward the lower surface 6D.

For example, the slot 661 is formed such that the mobile terminal 20 is inserted in the slot 661 in the longitudinal direction of the mobile terminal 20. Specifically, an opening of the slot 661 is formed in correspondence with a size of an end portion of a mobile terminal 20 that has a predetermined size, the end portion being at an end in the longitudinal direction of the mobile terminal 20.

In addition, as shown in FIG. 6, the slot 661 holds the mobile terminal 20 in a state where the display surface 21 (an example of a second display surface of the present invention) of the mobile terminal 20 is exposed entirely to outside. Specifically, the slot 661 is formed such that its depth is a distance L1 (see FIG. 4) that is predetermined in correspondence with the size of the mobile terminal 20.

It is noted that the slot 661 may extend from the right surface 6E toward the left surface 6F, or from the left surface 6F toward the right surface 6E. In addition, the slot 661 may be formed such that the mobile terminal 20 can be inserted therein in a short direction of the mobile terminal 20. Furthermore, the slot 661 may hold the mobile terminal 20 in a state where a part of the display surface 21 is exposed to outside. In addition, a pair of elastic members may be formed on a pair of inner walls of the slot 661 that face each other, wherein when the mobile terminal 20 is inserted in the slot 661, the pair of elastic members are deformed and hold the mobile terminal 20 therebetween.

As described above, in the image forming apparatus 10 according to the first embodiment, the operation/display portion 6 includes the slot 661 that is configured to hold the mobile terminal 20. With this configuration, when a need arises to do the work, the user of the image forming apparatus 10 can insert the mobile terminal 20 that the user is carrying, in the slot 661 and do the work. In addition, the user of the image forming apparatus 10 can easily confirm contents of the display screens of the mobile terminal 20 and the operation/display portion 6 by turning a glance to the operation/display portion 6 in the middle of the work. Furthermore, after completion of the work, the user of the image forming apparatus 10 can operate the image forming apparatus 10 by operating the mobile terminal 20 that is in a state of being held in the slot 661.

Second Embodiment

Figure 7:
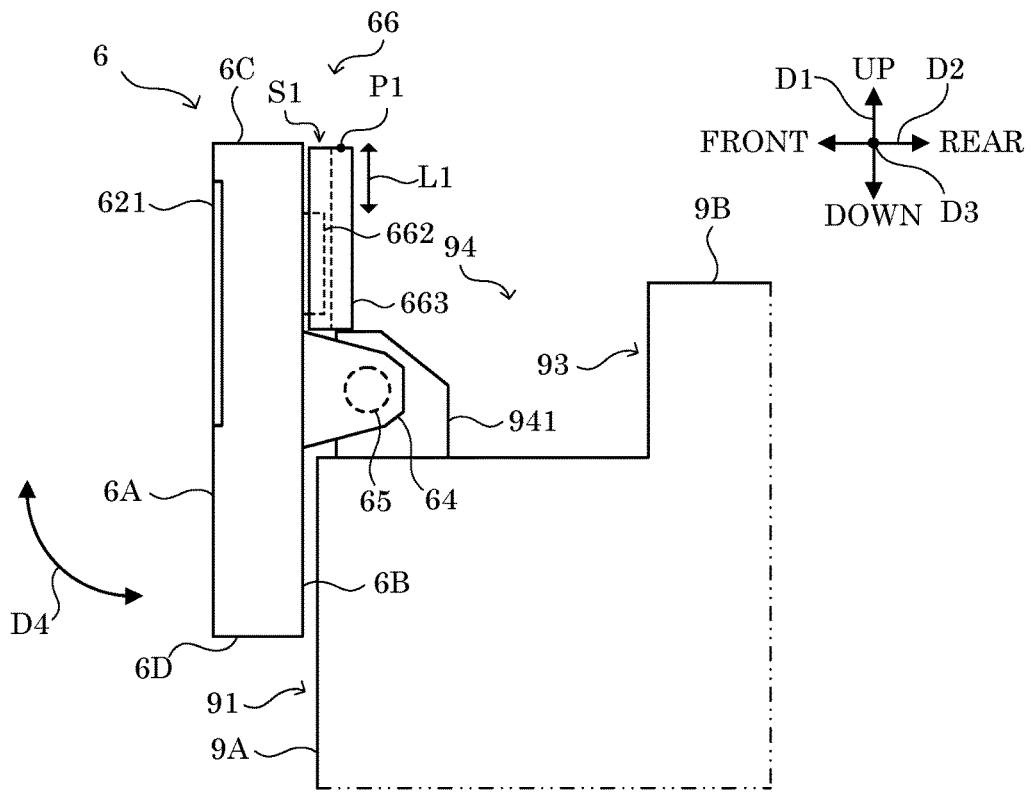
FIG. 7 is a diagram showing a configuration of a terminal holding portion of the image forming apparatus according to a second embodiment of the present invention.
Figure 8:
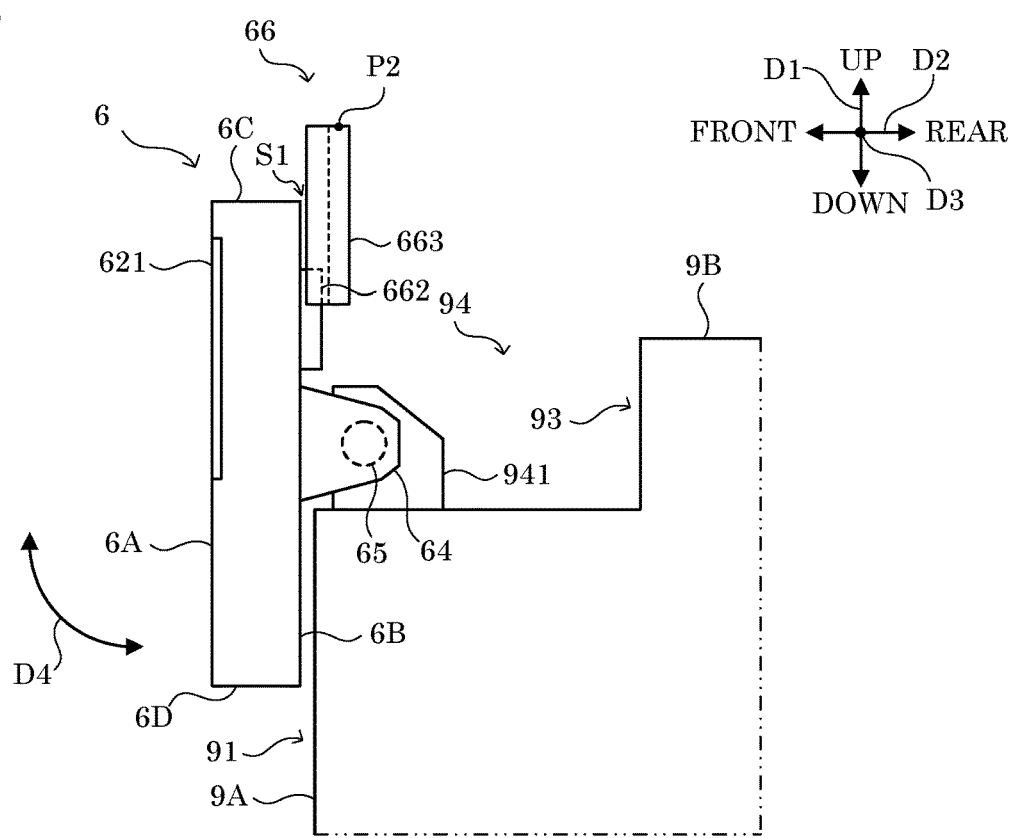
FIG. 8 is a diagram showing a configuration of the terminal holding portion of the image forming apparatus according to the second embodiment of the present invention.
Figure 9:
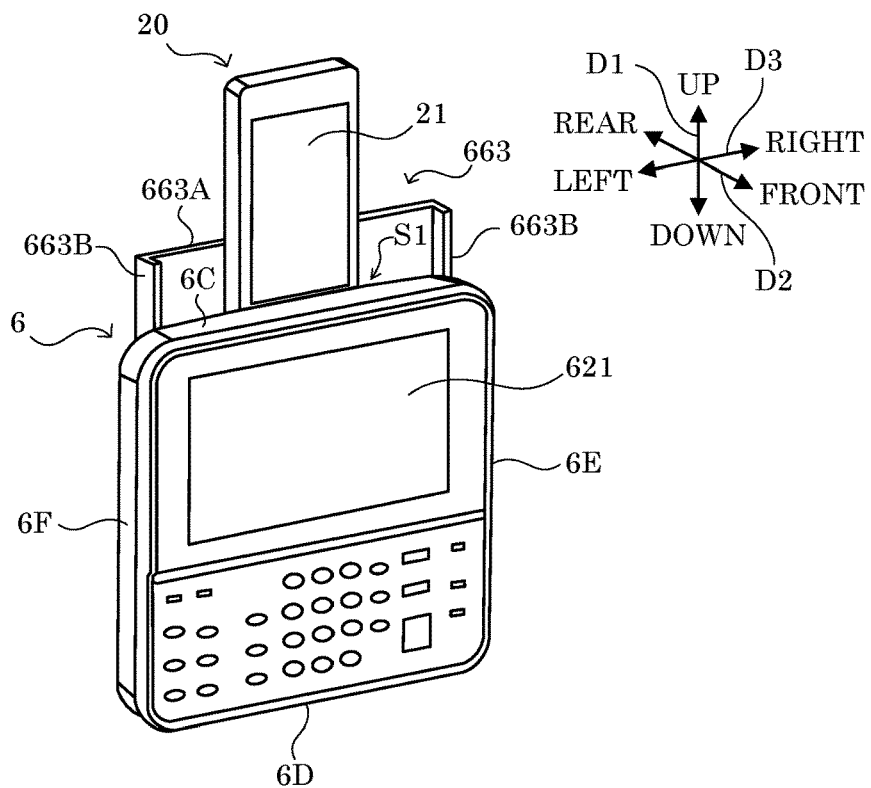
FIG. 9 is a diagram showing a state where the mobile terminal is held by the terminal holding portion of the image forming apparatus according to the second embodiment of the present invention.

Next, a description is given of the image forming apparatus 10 according to a second embodiment of the present invention with reference to FIG. 7 to FIG. 9. Here, FIG. 7 and FIG. 8 are side diagrams showing configurations of a projection portion 662 and a slide plate 663. In addition, FIG. 9 is a perspective diagram showing a state after the mobile terminal 20 is held in a holding space S1.

The second embodiment differs from the first embodiment in the configuration of the terminal holding portion 66. With regard to the other components, the first and second embodiments have the same configuration. As a result, only the configuration of the terminal holding portion 66 is described in the following.

As shown in FIG. 7 and FIG. 8, the terminal holding portion 66 of the image forming apparatus 10 according to the second embodiment includes the projection portion 662 and the slide plate 663.

The projection portion 662 is formed to project from the rear surface 6B of the operation/display portion 6. For example, the projection portion 662 is provided at a position on the rear surface 6B that is separated from the upper surface 6C of the operation/display portion 6 toward the lower surface 6D by the distance L1. For example, the projection portion 662 is formed to extend in the left-right direction D3 on the rear surface 6B.

The slide plate 663 is disposed to face the rear surface 6B of the operation/display portion 6 across the projection portion 662. The slide plate 663 is supported in such a way as to be movable between a first position P1 (see FIG. 7) and a second position P2 (see FIG. 8), wherein at the first position P1, the slide plate 663 is in a region covered by the rear surface 6B, and at the second position P2, the slide plate 663 projects to outside the region covered by the rear surface 6B, beyond the upper surface 6C. The slide plate 663 is formed to extend in the left-right direction D3 and cover the projection portion 662.

As shown in FIG. 9, the slide plate 663 includes a main body portion 663A and wall portions 663B, wherein the main body portion 663A is disposed to face the projection portion 662, and the wall portions 663B respectively stand at opposite ends of the main body portion 663A in the left-right direction D3. For example, the wall portions 663B are provided with claw portions (not shown) that project toward the inside of the main body portion 663A. The claw portions are engaged with groove portions (not shown) that are formed at opposite ends of the projection portion 662 in the left-right direction D3 so as to extend in a direction in which the right surface 6E and the left surface 6F extend. With this configuration, the slide plate 663 is supported in such a way as to be slidable along the groove portions. It is noted that when the slide plate 663 is pulled up to the second position P2, a further movement of the slide plate 663 from the second position P2 is restricted by a stopper (not shown).

The projection portion 662 and the slide plate 663, together with the rear surface 6B, form a holding space S1 (see FIG. 7 and FIG. 8) that is configured to hold the mobile terminal 20. Specifically, the holding space S1 is a space whose bottom is defined by the projection portion 662, whose four sides are surrounded by the main body portion 663A and the wall portions 663B of the slide plate 663, and the rear surface 6B, and whose top is opened.

The holding space S1 is formed such that the mobile terminal 20 can be inserted therein. Specifically, the length of the projection of the projection portion 662, and the distance between the slide plate 663 and the rear surface 6B are determined in correspondence with the thickness of the mobile terminal 20 of the above-mentioned size.

When the mobile terminal 20 is inserted in the holding space S1, a part of the rear surface of the mobile terminal 20 is supported by the slide plate 663. In addition, when the slide plate 663 is pulled up from the first position P1 to the second position P2, the area of the part of the rear surface of the mobile terminal 20 that is supported by the slide plate 663 increases. This allows the mobile terminal 20 inserted in the holding space S1 to be held stably.

As described above, in the image forming apparatus 10 according to the second embodiment, the projection portion 662 and the slide plate 663 are provided at the operation/display portion 6 so as to form the holding space S1 for holding the mobile terminal 20. With this configuration, as in the first embodiment, contents of the display screens of the mobile terminal 20 and the operation/display portion 6 can be easily confirmed even in a state where the mobile terminal 20 is not held by hand.

It is noted that in the image forming apparatus 10 according to the first embodiment, the slide plate 663 may be provided at the operation/display portion 6 so as to support the rear surface of the mobile terminal 20 inserted in the slot 661. Specifically, in the image forming apparatus 10 according to the first embodiment, the slide plate 663 may be provided on the rear surface of the operation/display portion 6, the slide plate 663 being supported in such a way as to be movable between the first position P1 and the second position P2, wherein in a state where the slide plate 663 is pulled up to the second position P2, the slide plate 663 supports the mobile terminal 20 inserted in the slot 661. For example, the slot 661 may hold the mobile terminal 20 that is in an attitude of being inclined with respect to the display surface 621 so that a rear end portion of the mobile terminal 20 inserted in the slot 661 comes in contact with the slide plate 663 pulled up to the second position P2. In addition, a rear inner wall of the slot 661 may be a surface of the slide plate 663. That is, the slot 661 may be formed by: a cut portion that is formed in the upper surface 6C of the operation/display portion 6; and the slide plate 663. In these cases, the slide plate 663 may not include the wall portions 663B.

Third Embodiment

Figure 10:
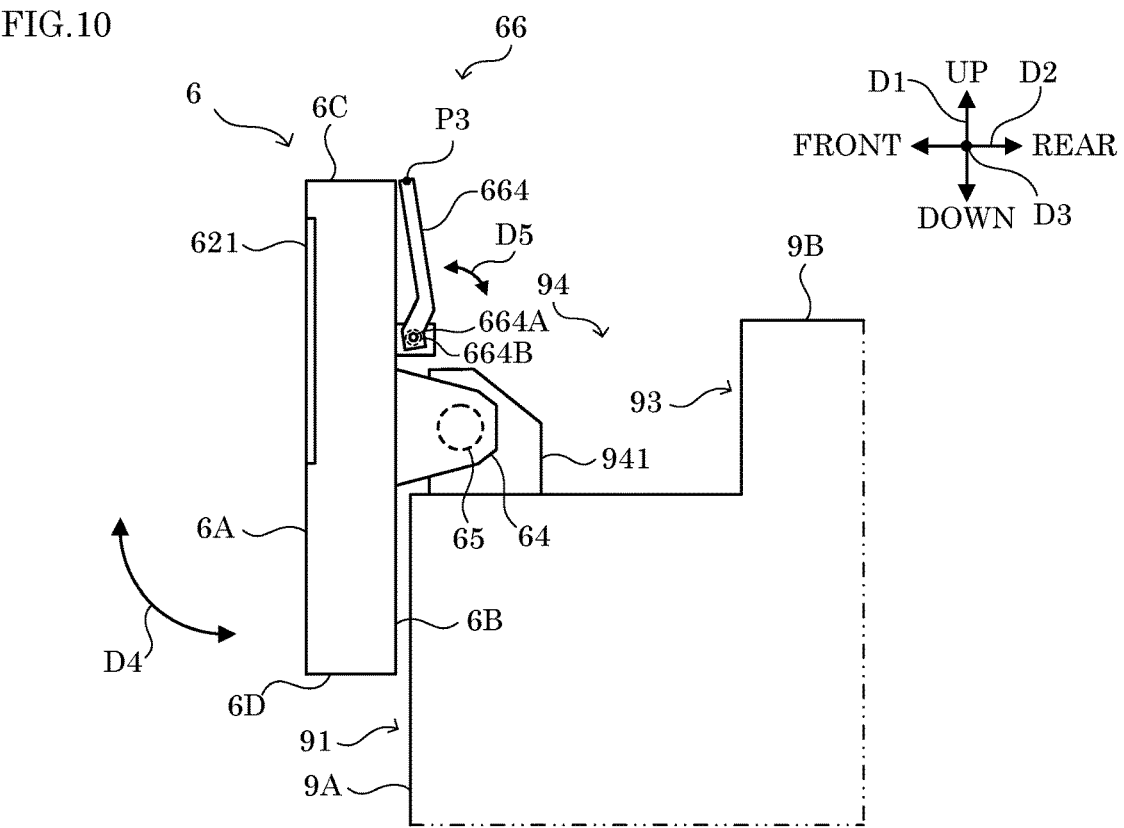
FIG. 10 is a diagram showing a configuration of a terminal holding portion of the image forming apparatus according to a third embodiment of the present invention.
Figure 11:
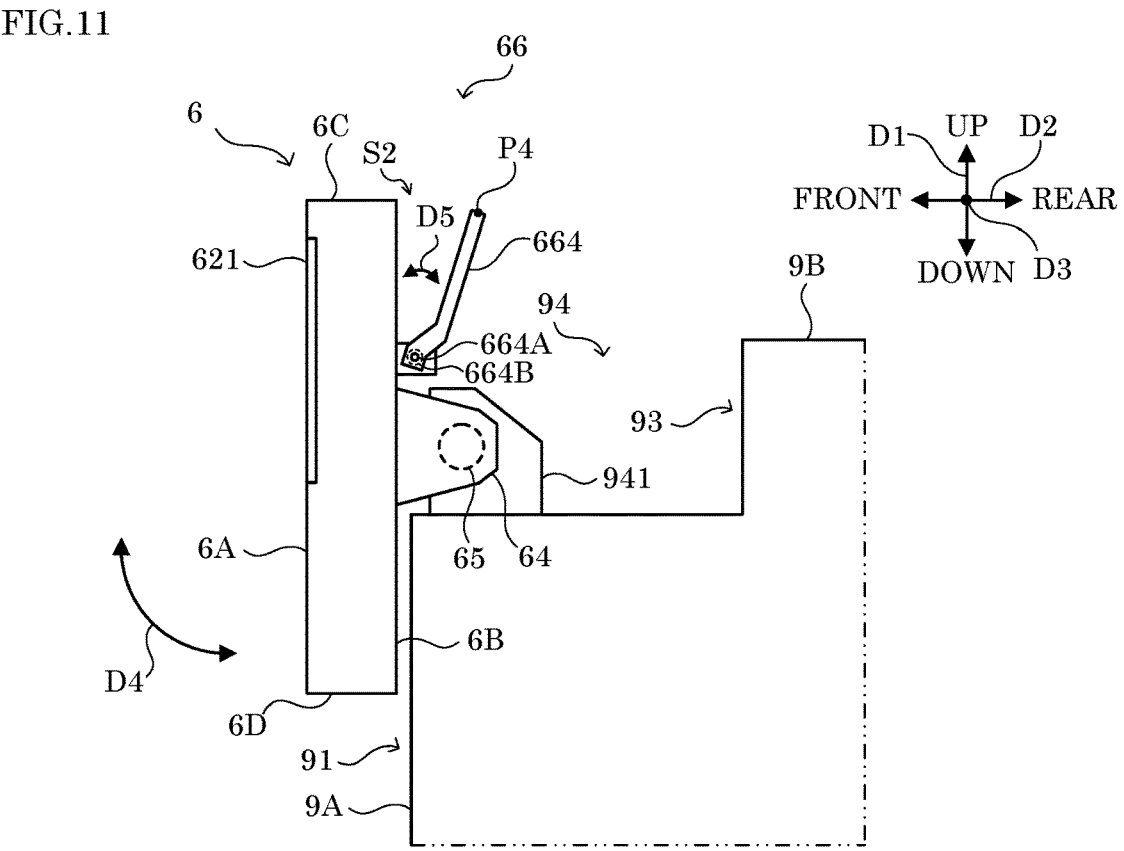
FIG. 11 is a diagram showing a configuration of the terminal holding portion of the image forming apparatus according to the third embodiment of the present invention.

Next, a description is given of the image forming apparatus 10 according to a third embodiment of the present invention with reference to FIG. 10 and FIG. 11. Here, FIG. 10 and FIG. 11 are side diagrams showing a configuration of a pivot plate 664.

The third embodiment differs from the first embodiment in the configuration of the terminal holding portion 66. With regard to the other components, the first and third embodiments have the same configuration. As a result, only the configuration of the terminal holding portion 66 is described in the following.

As shown in FIG. 10 and FIG. 11, the terminal holding portion 66 of the image forming apparatus 10 according to the third embodiment includes the pivot plate 664.

The pivot plate 664 is provided on the rear surface 6B of the operation/display portion 6, and supported in such a way as to pivot between a proximity position P3 (see FIG. 10) and a separate position P4 (see FIG. 11), wherein the pivot fulcrum is a portion of the rear surface 6B close to the lower surface 6D of the operation/display portion 6, the proximity position P3 is in proximity to the rear surface 6B, and the separate position P4 is separated from the rear surface 6B. The pivot plate 664 is formed to extend in the left-right direction D3.

Specifically, the pivot plate 664 is formed to pivot around a rotation shaft 664A (see FIG. 10) that is provided on the rear surface 6B of the operation/display portion 6 to extend in the left-right direction D3. For example, the pivot plate 664 includes the rotation shaft 664A. In addition, the rotation shaft 664A is pivotably supported by a bearing portion provided on the rear surface 6B of the operation/display portion 6. This allows the pivot plate 664 to pivot in a pivoting direction D5 shown in FIG. 10 and FIG. 11.

The pivot plate 664 is biased in a direction directed from the separate position P4 to the proximity position P3, and configured to hold the mobile terminal 20 between the pivot plate 664 itself and the rear surface 6B of the operation/display portion 6. For example, the pivot plate 664 is biased in the direction directed from the separate position P4 to the proximity position P3 by a torsion coil spring 664B attached to the rotation shaft 664A.

When no external force is applied to the pivot plate 664, the pivot plate 664 is located at the proximity position P3 by a biasing force of the torsion coil spring 664B. For example, the pivot plate 664 located at the proximity position P3 is in an attitude of being inclined toward the rear surface 6B, and an free end of the pivot plate 664 is in contact with the rear surface 6B.

In addition, when the pivot plate 664 is opened rearward by the user, the pivot plate 664 pivots from the proximity position P3 to the separate position P4 against the biasing force of the torsion coil spring 664B. When the pivot plate 664 pivots to the separate position P4, a space S2 (see FIG. 11) in which the mobile terminal 20 can be inserted, is formed between the pivot plate 664 itself and the rear surface 6B of the operation/display portion 6. With this configuration, when the user inserts an end portion of the mobile terminal 20 in the space S2 and release his/her hand from the mobile terminal 20, the mobile terminal 20 is held in between by the rear surface 6B and the pivot plate 664.

For example, the shape of the pivot plate 664, the position of the pivot fulcrum and the like are determined such that in a state where the mobile terminal 20 of the above-mentioned size is held by the rear surface 6B and the pivot plate 664 in between, the pivot plate 664 is in an attitude of being parallel to the rear surface 6B.

It is noted that the pivot plate 664 may not include the torsion coil spring 664B. For example, the operation/display portion 6 may include a stopper that locks to the pivot plate 664 to stop the pivoting thereof at a position where a holding space is formed to hold the mobile terminal 20 between the pivot plate 664 and the rear surface 6B.

As described above, in the image forming apparatus 10 according to the third embodiment, the pivot plate 664 for holding the mobile terminal 20 is provided on the operation/ display portion 6. With this configuration, as in the first embodiment, contents of the display screens of the mobile terminal 20 and the operation/display portion 6 can be easily confirmed even in a state where the mobile terminal 20 is not held by hand.

The invention claimed is:

1. An image forming apparatus comprising:
an image forming portion configured to form an image on a sheet;
an image reading portion provided above the image forming portion and configured to read an image from a document sheet;
a housing storing the image forming portion and the image reading portion;
an operation/display portion provided more outside the housing than a front surface of the housing, the operation/display portion used to operate the image forming apparatus; and
a terminal holding portion provided at the operation/display portion and configured to hold a mobile terminal that is smaller in size than the operation/display portion, wherein
the operation/display portion includes a first display surface, and is formed in a shape of a parallelepiped box that is flat along a plane that is parallel to the first display surface, and
the terminal holding portion includes:
a slot formed to extend from an upper surface of the operation/display portion toward a lower surface of the operation/display portion, and formed such that the mobile terminal of a flat shape can be inserted therein,
the mobile terminal includes a second display surface, and the slot holds the mobile terminal in a state where a part or whole of the second display surface is exposed to outside,
the terminal holding portion includes:
a slide plate provided on a rear surface of the operation/display portion, and supported in such a way as to be movable between a first position and a second position, wherein at the first position, the slide plate is in a region covered by the rear surface, and at the second position, the slide plate projects to outside the region covered by the rear surface, beyond the upper surface, wherein
in a state where the slide plate is pulled up to the second position, the slide plate supports the mobile terminal inserted in the slot.

2. An image forming apparatus comprising:
an image forming portion configured to form an image on a sheet;
an image reading portion provided above the image forming portion and configured to read an image from a document sheet;
a housing storing the image forming portion and the image reading portion;
an operation/display portion provided more outside the housing than a front surface of the housing, the operation/display portion used to operate the image forming apparatus; and
a terminal holding portion provided at the operation/display portion and configured to hold a mobile terminal that is smaller in size than the operation/display portion, wherein
the operation/display portion includes a first display surface, and is formed in a shape of a parallelepiped box that is flat along a plane that is parallel to the first display surface, and
the terminal holding portion includes:
a projection portion formed to project from a rear surface of the operation/display portion; and
a slide plate disposed to face the rear surface across the projection portion, and supported in such a way as to be movable between a first position and a second position, wherein at the first position, the slide plate is in a region covered by the rear surface, and at the second position, the slide plate projects to outside the region covered by the rear surface, beyond an upper surface of the operation/display portion, wherein
the projection portion and the slide plate, together with the rear surface, form a holding space that is configured to hold the mobile terminal of a flat shape.

* * * * *